United States Patent [19]
Lofthus et al.

[11] Patent Number: 5,381,165
[45] Date of Patent: Jan. 10, 1995

[54] RASTER OUTPUT SCANNER WITH PROCESS DIRECTION REGISTRATION

[75] Inventors: Robert M. Lofthus, Honeoye Falls; Aron Nacman, Rochester; Stuart A. Schweid, Henrietta, all of N.Y.

[73] Assignee: Xerox Corporation, Stamford, Conn.

[21] Appl. No.: 971,122

[22] Filed: Nov. 4, 1992

[51] Int. Cl.$^6$ .................. G01D 9/42; G01D 15/06; G01D 15/14
[52] U.S. Cl. .................................... 346/108; 346/157; 346/160
[58] Field of Search .................. 346/157, 160, 108

[56] References Cited

U.S. PATENT DOCUMENTS

| | | | |
|---|---|---|---|
| 4,611,901 | 9/1986 | Kohyama et al. | 355/4 |
| 4,613,877 | 9/1986 | Spencer et al. | 346/160 |
| 4,791,452 | 12/1988 | Kasai et al. | 355/14 D |
| 4,833,503 | 5/1989 | Snelling | 355/259 |
| 4,837,636 | 6/1989 | Daniele et al. | 358/300 |
| 4,893,135 | 1/1990 | Jamzadeh | 346/108 |
| 5,081,477 | 1/1992 | Gibson | 346/160 |
| 5,115,256 | 5/1992 | Miyagi et al. | 346/108 |
| 5,264,870 | 11/1993 | Egawa | 346/108 |
| 5,305,023 | 4/1994 | Fukushige et al. | 346/108 |

FOREIGN PATENT DOCUMENTS

| | | | |
|---|---|---|---|
| 62-244066 | 10/1987 | Japan | G03G 15/01 |
| 62-266575 | 11/1987 | Japan | G03G 15/01 |
| 62-287270 | 12/1987 | Japan | G03G 15/01 |

OTHER PUBLICATIONS

"Pulse-Width Modulation Control of Brushless Motors", Schweid et al., Xerox Disclosure Journal, vol. 16, No. 3, May/Jun. 1991, pp. 153–155.

Primary Examiner—Benjamin R. Fuller
Assistant Examiner—Randy W. Gibson

[57] ABSTRACT

A method and apparatus is presented for registering a plurality of color images formed on a photoconductive member in a process direction. The registration is enabled by a feedback loop wherein the phase and frequency of start-of-scan signals and a stable reference output signal are compared to produce an error signal representing frequency differences between the rotating polygons associated with each Raster Output Scanner. In one embodiment, the stable reference frequency is generated as a digital value by a microcontroller. In another embodiment, the digital value to be compared with the start-of-scan signal is generated by an encoder which provides a signal representing the motion of the moving photoconductive member. With either reference frequency, an error signal is generated which is applied as a pulse width modulated signal to the polygon drive motors to change the speed and frequency of the associated rotating polygon and, the speed, in turn, changing the SOS signals to complete the feedback loop. The process is iterative with pulse width modulated correction signals being applied until the comparison of the digital values representing the reference frequency and the SOS signals is reduced to zero. In a third embodiment, a phase correction circuit is described to enable subpixel registration.

8 Claims, 5 Drawing Sheets

RASTER OUTPUT SCANNER WITH PROCESS DIRECTION REGISTRATION

BACKGROUND AND MATERIAL DISCLOSURE STATEMENT

This invention relates generally to a raster output scanning system for producing a high intensity imaging beam which scans across a movable photoconductive member to record electrostatic latent images thereon, and, more particularly, to an apparatus for providing registration of the beam in the process direction movement of the photoconductive member.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets. The light beam is reflected from a facet and thereafter focused to a "spot" on the photosensitive member. The rotation of the polygon causes the spot to scan linearly across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with art input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or multiple pass system.

In a single pass, process color xerographic system, three ROS stations are positioned adjacent to a photoreceptor surface and selectively energized to create successive image exposures, one for each of the three basic colors. A fourth ROS station may be added if black images are to be created as well. In a multiple pass system, each image area on the photoreceptor surface must make at least three revolutions (passes) relative to the transverse scan line formed by the modulated laser beam generated by a ROS system. With either system, each image must be registered to within a 0.1 mm circle or within a tolerance of ±0.05 mm. Each color image must be registered in both the photoreceptor process direction (skew registration) and in the direction parallel to the process direction (referred to as fast scan or transverse registration). Registration in the transverse direction of a single pass ROS system is known in the prior art and a preferred registration technique is disclosed in U.S. Pat. No. 5,237,521 issued on Aug. 17, 1993, assigned to the same assignee as the present invention. Contents of this application are hereby incorporated by reference.

The following references were located during a pre-ex search: U.S. Pat. No. 4,893,135 to Jamzadeh; U.S. Pat. No. 4,837,636 to Daniele et al.; Japanese Patent No. 62-244066 to Ito; Japanese Patent No. 62-266575 to Kaneko and Japanese Patent No. 62-287270 to Mitekura. Japanese Patent No. 62-266575 to Kaneko discloses a method for achieving color registration in a multiple laser scanning system. An image recording signal is outputted, and each laser beam $2a$–$2d$ begins scanning after a particular respective set amount of time Na—Nd. Each particular set time Na—Nd for beginning scanning at each imaging station is shortened or extended by an amount proportional to a color shear value (i.e. a misregistration amount) detected by a corresponding optical position detector $12a$–$12d$ at each station. Japanese Patent No. 62-244066 to Ito, assigned to Fuji Xerox Co. Ltd., discloses a method for synchronizing multiple deflecting mirrors wherein a crystal oscillator is used to generate a stable speed reference clock. The speed reference clock is supplied in common to scanning speed control circuits 28B, 28C, 28M and 28Y for synchronously controlling deflecting mirror motors 22B, 22C, 22M and 22Y. Japanese Patent No. 62-287270 to Mitekura discloses a method of accurately superimposing plural images on one sheet of recording paper. Laser beam exposure among plural image forming devices is automatically controlled according to speed variations of a photosensitive drum and a transfer belt. U.S. Pat. No. 4,893,135 to Jamzadeh discloses a method of enhancing image registration in laser printers. The enhancement is provided by delaying the feeding of paper into an image transfer station by an amount of time a latent image was delayed in scanning at an exposing station when scanning was to begin. A time difference between a start of page signal and a start of line signal is converted to time delays used to extend or delay a conventional signal issued by a master system controller to feed paper into the transfer region. Xerox Disclosure Journal publication entitled "Pulse-Width Modulation Control of Brushless Motors" (Schweid et al., Vol. 16, No. 3 May/June 1991, p. 153) relates to pulse width modulation control of brushless DC motors. U.S. Pat. No. 4,837,636 to Daniele et al. discloses a photoreceptor having marks placed thereon, used to determine photoreceptor speed and position.

The present invention is directed towards a method and apparatus for registering the color images in the process direction. Errors of the spot position in the process direction can originate from a number of sources including polygon facet and/or motion flaws, changes in the velocity of the photoreceptor, and changes in the spacing, in the process direction, between successive ROS units. The present invention is directed to eliminating all three types of errors. In a first embodiment, a start-of-scan sensor is connected via a feedback loop with each polygon ROS motor. A desired reference frequency, generated as an internal, digital value within a microcontroller, is compared with the start-of-scan (SOS) sensor output within said microcontroller using the technique described in U.S. Pat. No. 5,208,796 issued on May 4, 1993, assigned to the same assignee as the present invention, whose contents are hereby incorporated by reference. The commanded voltage to the motor is adjusted until the frequency of the start-of-scan signal coincides with the desired reference frequency. The same microcontroller is used to control the motion of each of the ROS motor polygon assemblies and thus the use of a common, internal digital value ensures that all ROS units are rotating at the same, identical frequency.

In a second embodiment, the relative frequency error between the motion of the motor polygon assemblies and that of the photoreceptor is further reduced by using encoded signals representing the photoreceptor velocity as the reference signal to be compared with the SOS signals within a microcontroller using the technique described in U.S. Ser. No. 07/569,808, referenced supra. In a third embodiment, relative phase control between successive ROS units, each using encoded signals representing the photoreceptor velocity as the reference signal to be tracked, is introduced to eliminate sub pixel errors in SOS line formation.

More particularly, the present invention relates to an imaging system for forming multiple image exposure frames on a photoconductive member moving in a process direction including:

- a plurality of Raster Output Scanners (ROS) units, each ROS unit associated with the formation of one of said image exposure frames, each ROS unit forming a plurality of scan lines in a fast scan (transverse) direction across the width of said member, by reflecting modulated beams from the multi-faceted surfaces of a rotating polygon, each polygon driven by a separate drive motor,
- means for detecting at least the beginning of the scan line and providing a start of scan (SOS) signal representing such detection,
- means for generating a stable reference frequency output signal,
- means for comparing the phase and frequency of said reference output signal with that of the SOS signal, and means for generating an error output signal when a difference in phase and frequency exists, and
- means for pulse width modulating drive signals to said polygon motors in response to said error output signal thereby changing polygon speed whereby the phase of the SOS signal is continually adjusted in a feedback loop until said comparing means error output signal is reduced to zero.

DESCRIPTION OF THE INVENTION

Figure 1:
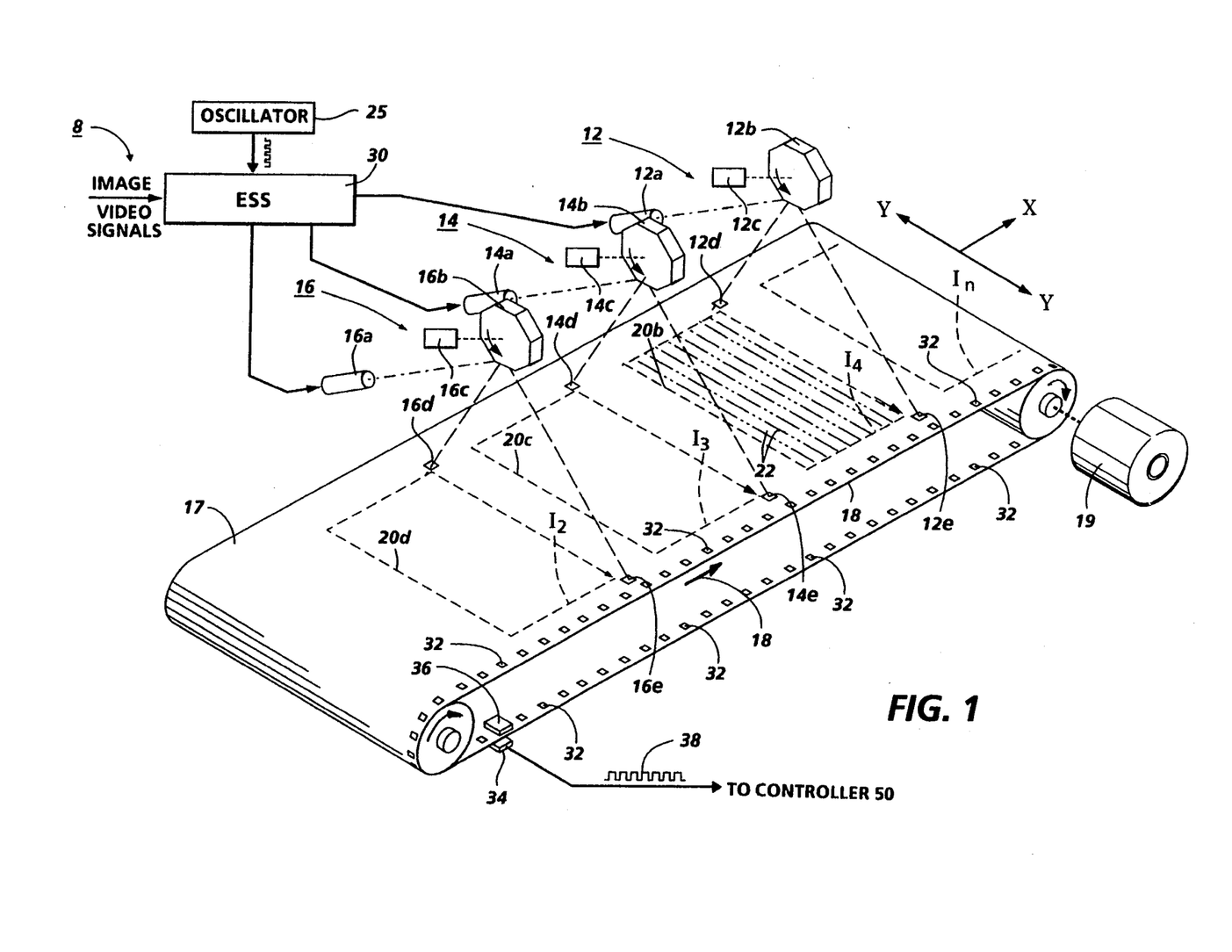
FIG. 1 shows a single-pass ROS color printing system incorporating the process direction registration control circuits of the present invention.

FIG. 1 shows a single pass, ROS process color printing system 8 having three ROS stations, 12, 14, and 16. A fourth station may be used if desired to achieve full process color including black. The system 8 includes a photoreceptor belt 17, driven in the process direction, indicated by the arrow 18. The length of the belt 17 is designed to accept an integral number of spaced image areas represented by dashed line rectangles in FIG. 1. Three image areas, $I_2$, $I_3$, $I_4$ are represented but additional image frames ($I_n$) may be used depending on system specifications. Upstream of each image area is a charging station (not shown) which places a predetermined electrical charge on the surface of belt 18. As each of the image areas $I_2$-$I_4$ reaches a transverse image from start of scap line, represented by lines 20b, 20c, 20d, the associated image frames $I_2$, $I_3$, $I_4$ are progressively exposed on closely spaced transverse raster lines 22, shown with exaggerated longitudinal spacing on the image area $I_4$. Lines 20b, 20c, 20d represent the first scan line of the associated image frame and are formed by techniques known in the art and described, for example, in previously referenced copending application Ser. No. 07/635,835. Each image area, $I_4$, $I_3$, $I_2$ is exposed successively by ROS systems 12, 14 and 16. Downstream from each exposure station, a development station (not shown) develops the latent image formed in the preceding image area. A fully developed color image is then transferred to an output sheet. Details of charge, development and transfer xerographic stations in a multiple exposure, single pass system are disclosed, for example, in U.S. Pat. Nos. 4,833,503; 4,611,901 and 4,791,452, whose contents are hereby incorporated by reference. The charge, development and transfer stations are conventional in the art. Each ROS system contains its own conventional scanning components, of which, the laser light source, the rotating polygon and the polygon drive motor are shown. For example, system 12 has a gas, or preferably, laser diode 12a, whose output is modulated by signals from control circuit 30 and optically processed to impinge on the facets of polygon 12b, rotated by motor 12c. Each facet of polygon 12b reflects the modulated incident laser beam as a focused scan line, utilizing conventional post-polygon optics (not shown). Electronic Sub System (ESS) 30 contains the circuit and logic modules which respond to input video data signals and other control and timing signals, described in further detail below, to drive the photoreceptor belt 17 synchronously with the image exposure and to control the rotation of the polygon 12b by a motor 12c. The other ROS systems 14, 16, have their own associated laser diodes 14a, 16a, and polygons 14b, 16b, and polygon motors 14c, 16c, respectively.

Continuing with a description of the embodiment shown in FIG. 1, photoreceptor belt 17 is driven in the indicated clockwise direction by belt drive motor 19. A plurality of timing marks 32 are provided along one edge of the belt outside the image area. A sensor 34 and cooperating light source 36 are mounted on opposite sides of the belt so as to sense the path of movement therepast of marks 32. Details of the generation of signal pulses representing photoreceptor belt travel in the process direction are disclosed in U.S. Pat. No. 4,837,636, whose contents are hereby incorporated by reference. It is understood that the period of frequency of the signal pulse train 38 is determined by the speed or velocity of belt 17. Also shown in FIG. 1 are two sets of scan line sensors associated with each ROS station. ROS station 12 has a start-of-scan (SOS) scan 12d and an end of sensor (EOS) scan 12e which are positioned adjacent to the surface of belt 18 at the ends of the path of the scanning beam. Sensors 12d and 12e generate a pulse each time a scan line is swept across the photoreceptor surface, thereby establishing a start and end of scan for that particular line. Each ROS, 14, 16 has an associated detector pair 14d, 14e and 16d, 16e, respectively. The SOS sensor outputs are used in a manner described in detail below.

Figure 2:
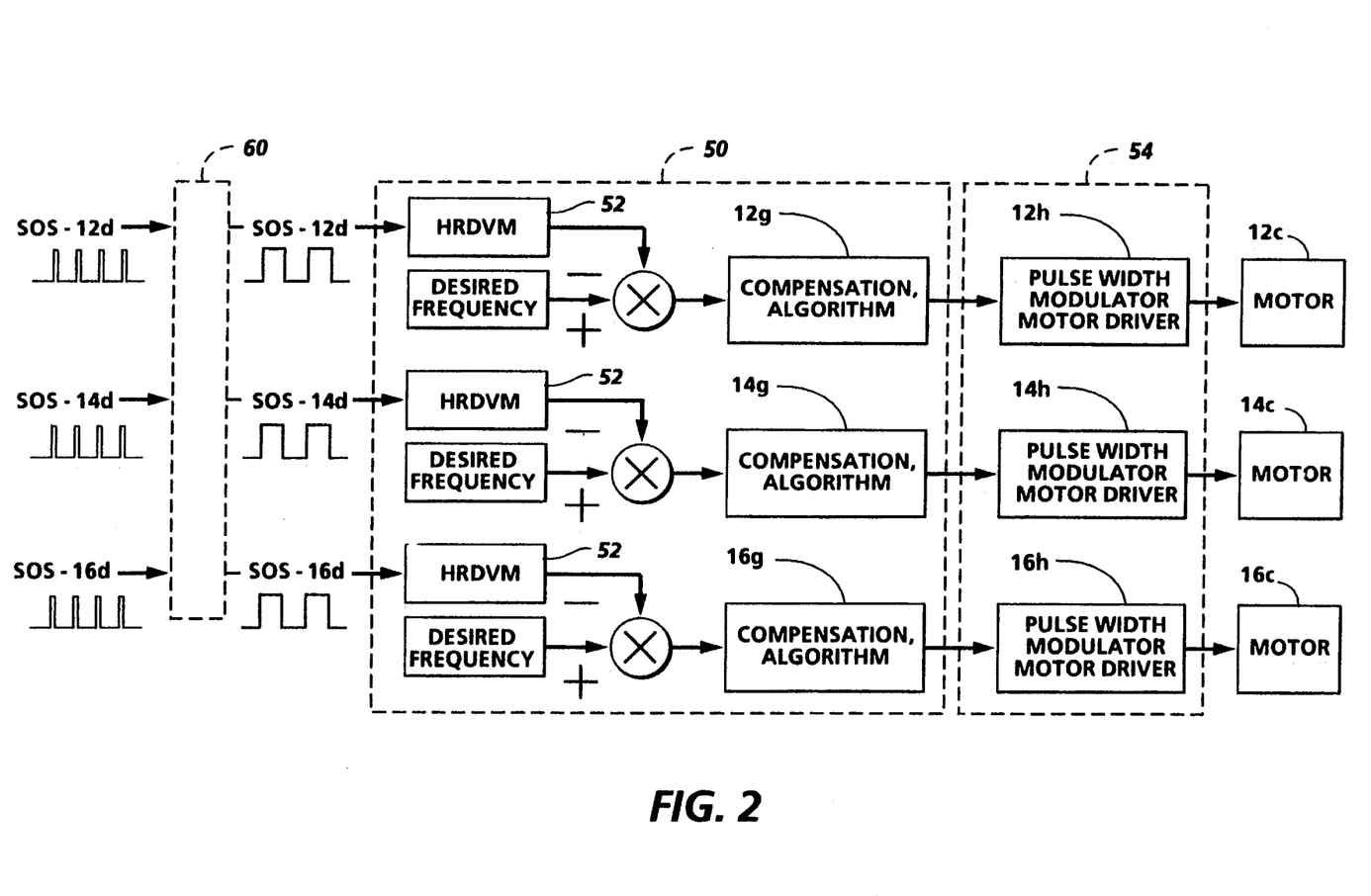
FIG. 2 is a block diagram of the control circuitry of a first embodiment of the invention.

According to a first embodiment of the invention, polygon motors 12c, 14c, and 16c are phase locked to a stable reference and synchronized so that the position of the scan lines formed by the respective ROS systems are fixed relative to one another and thus, lacking any other error sources, are registered in the process direction. Referring to FIGS. 1, 2 and 6, this is accomplished by using a microcontroller 50 in which a single digital value, representing the desired frequency, is used for comparison with values representing the motion of the three ROS units. According to this aspect of the present invention, signals from the start-of-scan sensor associated with each ROS (sensors 12d, 14d, 16d) are first converted into TTL compatible square waves, as is known in the art, by the conditioning circuit 60 shown in FIG. 2 and the resulting signals input into microcontroller 50 wherein each conditioned SOS signal is converted into a digital value by a HRDVM (High Resolution Digital Velocity Measurement) circuit 52 within the microcontroller. This technique is described in U.S. Ser. No. 07/569,808, referenced supra. The outputs of each HRDVM are then compared to the common digital value representing the desired reference frequency. The error signal so formed is then acted upon by compensation algorithm circuits 12g, 14g, 16g. To ensure zero DC error with respect to frequency variations, the compensation algorithms each contain at least one integrator term of the type used in the field of Automatic Controls and as practiced by one skilled in the art. Pulse width modulated (PWM) signals are then generated, proportional to the digital value outputs of the compensation algorithms. Said PWM signals are then input to the drive circuit 54 containing pulse width modulator circuits, 12h, 14h, 16h. These circuits generate signals which adjust the speed of the associated polygon motor by pulse width modulation of the motor poles. The SOS sensors 12d, 14d, 16d reflect the adjusted speed of the motors, completing a feed back loop for each ROS. The error signals are eliminated in an iterative process; thus, registration errors occurring due to variations in the rotational motion, i.e., velocity and position, of one ROS unit relative to another, are also eliminated.

Figure 3:
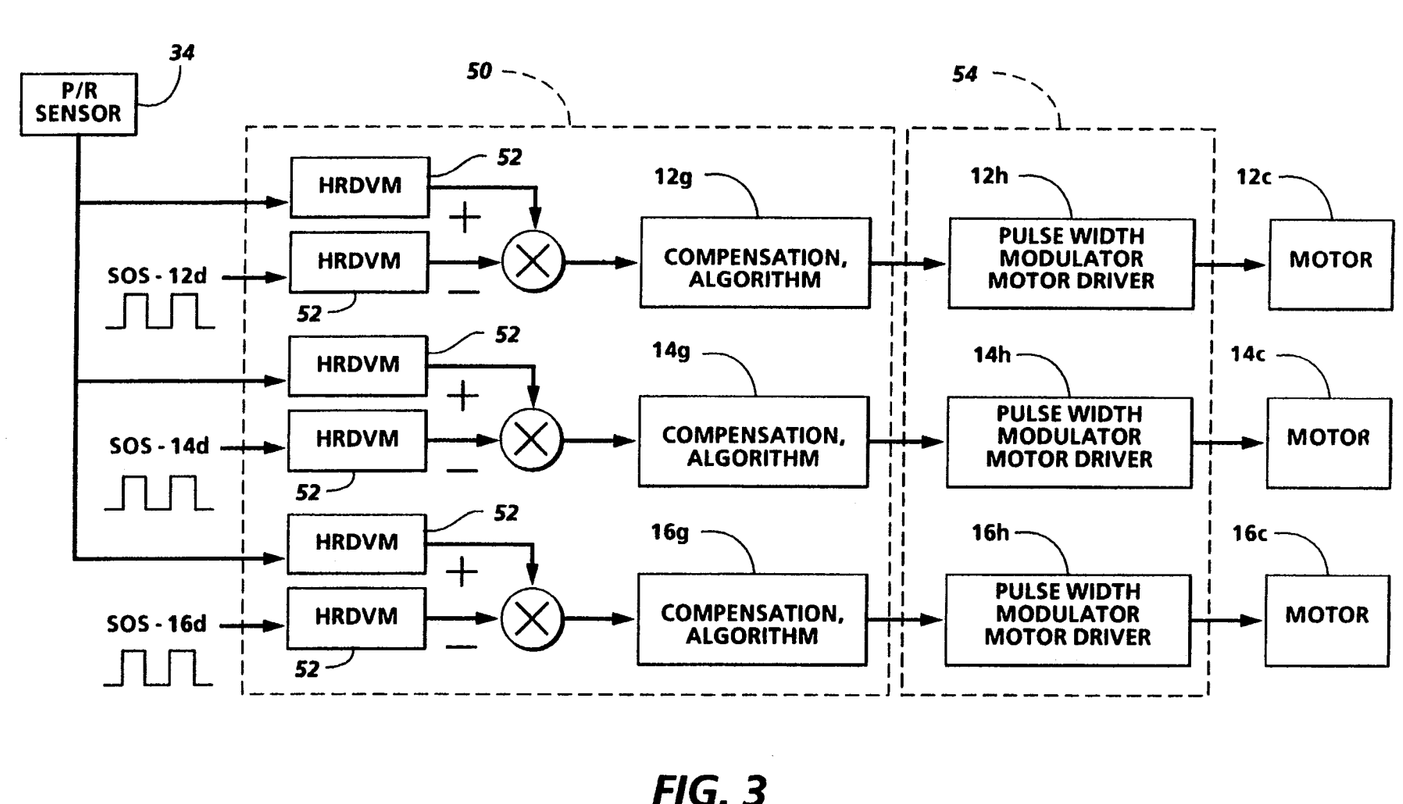
FIG. 3 is a block diagram of the control circuitry of a second embodiment of the invention.

However, in the single pass system shown in FIG. 1, there still exists the problem that even if all the polygons 12b, 14b, 16b are synchronized, photoreceptor 17 is still moving asynchronously with respect to the polygons; e.g. relative velocity variations exist between the ROS units and the photoreceptor. So, for purposes of process registration, the position of the beam is known, but not whether it is in the exact position to start the lead edges 20b, 20c, 20d of the associated sequential image frames in perfect registration. According to a second embodiment of the present invention, and referring to FIGS. 1 and 3, the motion of the photoreceptor 17 is encoded by sensor 34, which matches the slow scan resolution (lines per inch), and the output frequency from sensor 34 is input into the microcontroller 50 and, after conversion to a digital value by HRDVM circuit 52, is compared to the digital value representing the frequency of the signal generated by the SOS sensor after said signal is converted to TTL compatible square waves as described above. The resulting error(s) are again input into compensation algorithm circuits 12g, 14g, 16g, each containing at least one integrator term as described above. The resulting closed loop system is one in which the rotational velocity of the three successive ROS units, as represented by their start-of-scan signals, each track the signal representing the velocity of the photoreceptor. In such a manner, the motion of the ROS units is fixed relative to one another and to the photoreceptor and thus, lacking any other error sources, is registered in the process direction.

Figure 4A:
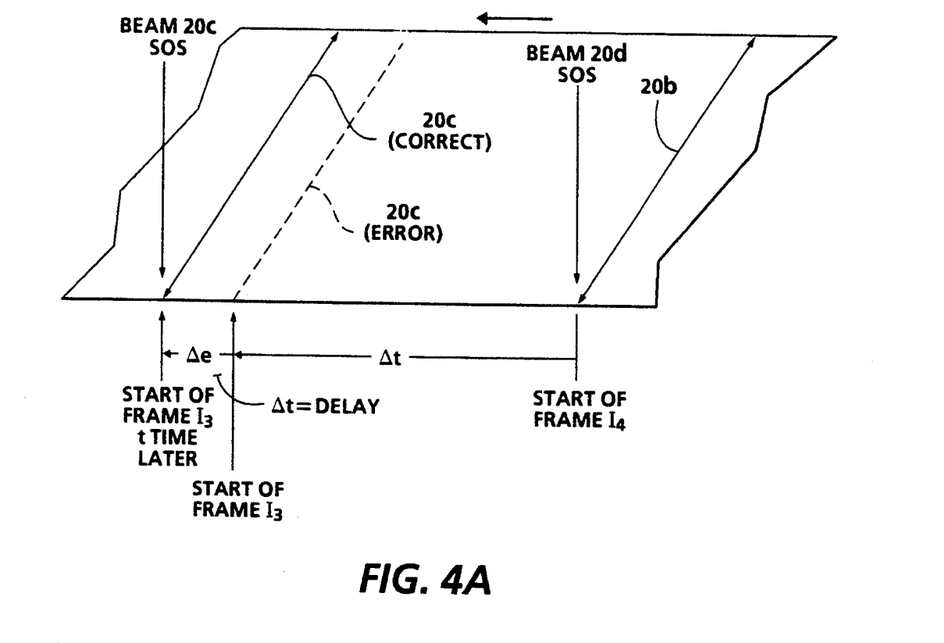
FIG. 4A is a partial top perspective view of the photoreceptor belt and FIG. 4B shows sub pixel error signals generated between two successive ROS stations.

The above described solution to the beam positioning and start-of-scan signal line results in a very accurate line spacing within a pixel of accuracy. Certain systems require even greater accuracy, and according to a third embodiment of the invention, sub-pixel line errors are eliminated. In order to understand the sub-pixel line error, reference is made to FIG. 4A which shows a portion of belt 17 illustrated in formation of start of frame scan lines 20d, 20c. It is assumed that polygons 12b, 14b are synchronized with the photoreceptor, but the photoreceptor motion is asynchronous. If the scan line spacing were perfect; (i.e. if each ROS were mechanically mounted exactly N number of scan lines from the previous ROS), then 20c would be laid down N number of start-of-scans away from the formation of 20d. Therefore, the start-of-scan for forming line 20c would happen at the exact moment that the image arrived at the required position. FIG. 4A shows the situation where the leading edge of the next image frame $I_3$ is $n+\frac{1}{2}$ start-of-scan or $\frac{1}{2}$ pixel further from the leading edge of image frame $I_4$. Thus, instead of forming a line 20c in the "correct" (solid line) position, the line is formed in an inaccurate (dotted) line position, separated from the required line by a slow scan pixel error, for this case assumed to be $\frac{1}{2}$ pixel (or about 20$\mu$). The solution to eliminating this error is to shift polygon 14b exactly 180° out of phase relative to polygon 12b in order to compensate for the $\frac{1}{2}$ pixel error. (For heuristic purposes, note that an error of $\frac{1}{3}$ pixel would be corrected by shifting polygon 14b exactly 120° out of phase with respect to polygon 12b, while an error of 0.7 pixel would result in a phase shift of 0.7×360°=252°, etc.)

Figure 4B:
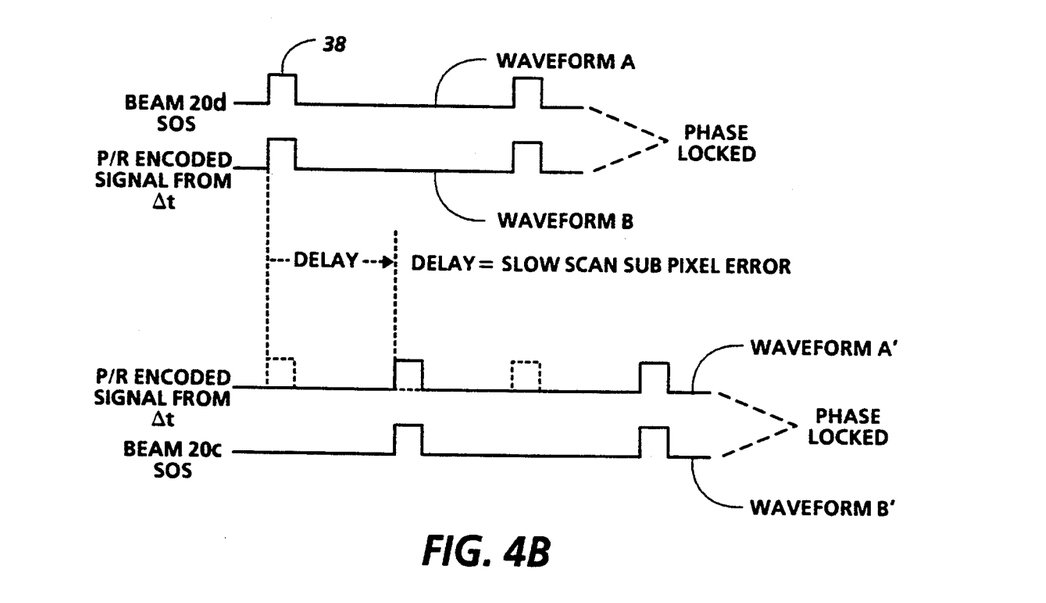
Figure 5:
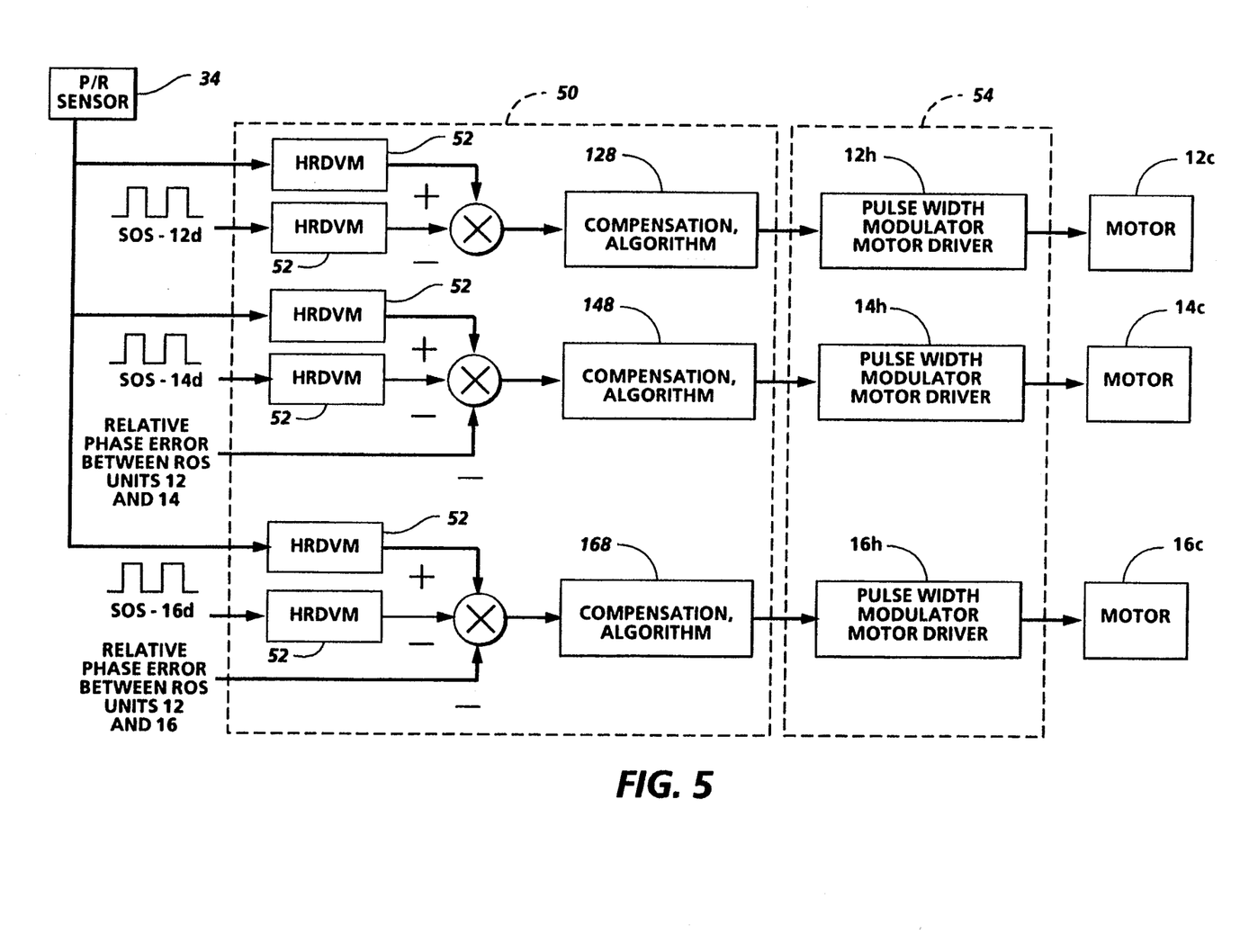
FIG. 5 is a block diagram of the control circuitry for a third embodiment of the invention.

Referring now to FIGS. 4B and 5, motor 12c is first phase locked to the belt velocity as described above; e.g. waveforms A and B, in FIG. 4B are made coincident. Thus, the positions of all of the scan lines 22 of image frame $I_4$ are known relative to the velocity of the belt. However, as shown in FIG. 4A, inaccurate mounting of the ROS has resulted in a slow scan sub-pixel error $\Delta e$. In order to have correct registration for the first line of imaging frame $I_3$, a phase difference, representative of the sub-pixel error, $\Delta e$, must be introduced between the relative motion of the two polygons 12b and 14b. The introduction of this phase error in a sampled-data feedback control is seen in FIG. 5 where, for completeness, a similar structure is shown to handle phase differences between polygons 12b and 16b. To more completely illustrate phase control as a means of attaining sub-pixel registration in the process direction, a numerical example is developed as follows. The sampling rate for the sample-data feedback controller shown in FIG. 5 is 500 Hz and the feedback rate from sensor 34, representing photoreceptor velocity, as well as that from each of the start-of-scan detectors (after proper conditioning) is 1200 Hz. With these feedback and sampling rates, the HRDVM circuit will produce a digital value that represents the number of whole and fractional cycles of each input signal that have occurred in the last sample period. In particular, the nominal value for the signals representing the photoreceptor as well as the the three polygons will be:

$$\frac{2.4 \text{ encoder cycles}}{\text{sample period}} = \frac{(1200 \text{ encoder cycles/sec})}{(500 \text{ samples/sec})}$$

In order to correct for the sub-pixel error, Δe, of ½ pixel as seen in FIG. 4, a value of 0.5 is introduced as relative phase error between ROS units 12 and 14 as seen in FIG. 5 for one sample period. After that sample period, the relative phase error will return to its nominal value of zero and after an appropriate amount of time, depending on the closed loop bandwidth of the system, the result will be that the phase relationship of the two signals representing the angular velocities of polygons 12b and 14b will have shifted by 180° and the two velocities will once again be identical. A pixel correction error can be generated in a number of ways. For example, ROS stations 12, 14, can be initially operated by ESS 30 to lay down only one scan line each, e.g. lines 20d, 20c. These lines are developed and an output print is made. The offset lines can be measured with sub-pixel accuracy by inspection under magnification. The misregistration error is then converted into the whole, n, and fractional, Δe, pixel errors. To accommodate correction of the whole pixel errors, ESS 30 is instructed to delay or advance the writing time for the start of image frame $I_3$ by n cycles, while a value of relative phase error, proportional to the subpixel error, Δe, is introduced, as explained above.

While the three embodiments discussed above have been illustrated with respect to a single pass system with three ROS units writing in series, the same principles covered by this invention can be applied to a multi-pass system in which each colorant image is written by the same ROS on successive, whole traverses of the (belt or drum) photoreceptor. In this case, an upstream sensor, the start-of-image sensor, located a nominal distance from the writing location, is the key time marker used to note the relative phase error of the ROS and to start correction of the relative phase error in precisely the same manner as noted above. The registration sensor may take the form of a detector associated with each ROS, detecting light from either a ROS scanning beam or from a dedicated light source, which impinges on the detector through a belt hole which passes periodically in to view. One technique for ROS process registration using a belt hole is disclosed in co-pending application, U.S. Ser. No. 07/807,927, filed on Dec. 16, 1991, assigned to the same assignee as the present invention, whose contents are hereby incorporated by reference. In a multi-pass system, even with a single ROS unit tracking the (drum or belt) photoreceptor velocity, subpixel errors between successive colorant images will occur: (1) due to the fact that the length of the belt path is not an integer multiple of pixel size; (2) due to initial misalignment between the upstream, image sensor and the ROS location; (3) due to the effect of thermal expansion or creep/stretch phenomena during machine operation.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming multiple image exposure frames on a photoconductive member moving in a process direction including:

a plurality of units, each of said ROS units associated with the formation of one of said multiple image exposure frames, each of said ROS units forming a plurality of scan lines, at a given low scan resolution in a fast scan direction across a width of said member, by reflecting modulated beams from multi-faceted surfaces of a rotating polygon associated with each one of said ROS units, each polygon driven by a separate drive motor, means for detecting at least the beginning of each of the scan lines and providing a signal representing such detection, means for encoding said photoconductive member motion in the process direction and generating a stable reference frequency output signal equal to a slow scan resolution, means for comparing the phase and frequency of said reference output signal with that of the SOS signal, and means for generating an error output signal when a difference in phase and frequency exists motor of each of said ROS systems, and means for pulse width modulating drive signals to each said polygon motor in response to each said error output signal thereby changing polygon drive motor speed whereby the phase of the SOS signal is continually adjusted in a feedback loop until said comparing means error output signal is reduced to zero.

2. The imaging system of claim 1 wherein said means for generating a stable reference frequency output signal is a microcontroller which generates an internal digital value and further including conditioning circuit means for converting the SOS signal into a TTL compatible square wave signal and for converting said conditioned SOS signal into a digital value whereby said comparing means compares the phase and frequency of input digital values.

3. The imaging system of claim 2 further including means for converting said encoded reference output signal into a digital value whereby the comparing means compares the phase and frequency of input digital values.

4. The imaging system of claim 1 further including means to introduce phase correction into said feedback loop to generate a desired phase difference between said reference frequency output signal and said SOS signal digital value.

5. The imaging system of claim 1 wherein said multiple image exposure frames are formed on said photoconductive member during a single revolution of the member.

6. The imaging system of claim 1 wherein said multiple image exposure frames are formed on said photoconductive member during multiple revolutions of the member.

7. A method for registering color images in a process direction formed on the surface of a moving photoconductive image member by a plurality of systems, including the steps of:

(a) forming said images by scanning a plurality of beams across a width of the image member by reflecting modulated beams from the facets of a polygon rotated by a drive motor, each ROS system having said associated polygon drive motor, (b) detecting at least the beginning of each of said scan lines and for generating signals representative of said detection, (c) converting said SOS signals into TTL compatible square wave signals, (d) converting said square wave signals into a digital value, (e) encoding photoconductive image member motion to generate a digital reference value equal to slow scan resolution, (f) comparing the phase and frequency of the SOS digital value and of the reference value, (g) generating an error signal when a phase and frequency difference is found to be present in said comparing step, (h) converting said error signal into a pulse width modulated signal to said drive motor of each of said ROS systems to change a speed of the motor, and (i) repeating steps (b) through (h) until said error signal is reduced to zero.

8. The method of claim 7 further including the step of changing phase relativity between at least two polygons to eliminate sub-pixel errors.

* * * * *